US00RE35002E

United States Patent [19]

Matsubara et al.

[11] E Patent Number: Re. 35,002

[45] Reissued Date of Patent: Jul. 25, 1995

[54] FUEL CELL SYSTEM

[75] Inventors: Hisayoshi Matsubara; Yutaka Mizuno; Toshiharu Hanahima, all of Iwata, Japan

[73] Assignee: Yamaha Hatsudoki Kabushiki Kaisha, Iwata, Japan

[21] Appl. No.: 290,141

[22] Filed: Aug. 15, 1994

Related U.S. Patent Documents

Reissue of:

[64] Patent No.: 5,019,463
Issued: May 28, 1991
Appl. No.: 427,756
Filed: Oct. 26, 1989

[30] Foreign Application Priority Data

Oct. 28, 1988 [JP] Japan ..... 63-270764

[51] Int. Cl.[6] ..... H01M 8/04

[52] U.S. Cl. ..... 429/12; 429/17; 429/20

[58] Field of Search ..... 429/12, 17, 19, 20, 429/26, 34, 38, 39, 120

[56] References Cited

U.S. PATENT DOCUMENTS 4,310,604 1/1982 Marchetti ..... 429/26 X
4,362,789 12/1982 Dighe ..... 429/20 X
4,678,723 7/1987 Wertheim ..... 429/17

*Primary Examiner*—Anthony Skapars
*Attorney, Agent, or Firm*—Knobbe, Martens, Olson & Bear

[57] ABSTRACT

A fuel cell arrangement including an arrangement for improving start up by heating the fuel cell through supplying selectively heated exhaust gases from the reformer to the air port of the fuel cell.

9 Claims, 2 Drawing Sheets

FUEL CELL SYSTEM

Matter enclosed in heavy brackets [ ] appears in the original patent but forms no part of this reissue specification; matter printed in italics indicates the additions made by reissue.

BACKGROUND OF THE INVENTION

This invention relates to a fuel cell system and more particularly to an improved arrangement for operating a fuel cell to insure that it is brought to its operating temperature as rapidly as possible and to insure that the fuel cell does not become overheated.

It is well known that electrical energy can be supplied from a fuel cell that reacts an enriched or reformed fuel with air to produce electrical energy. Such systems include a cell that has fuel and air poles with an electrolyte matrix impregnated with an electrolyte such as phosphoric acid interposed therebetween. The devices operate with a hydrogen rich reformed gaseous fuel that produces electrical power and water through an electrical chemical reaction which is exothermic in nature. Because of the exothermic nature of the reaction, the fuel cell is generally operated at a temperature in the range of 200° C. and has its temperature maintained by means of a cooling jacket. However, when starting up the fuel cell, it is important to insure that the operating temperature is reached as soon as possible so as to permit full power utilization and insure against the loss of energy.

Devices have been proposed for insuring more rapid start up through the use of heaters for the air supply system that supplies the air to the air pole of the fuel cell. However, such devices complicate the system and also require electrical energy for their operation, thus somewhat defeating their purpose. It has also been proposed to raise the fuel cell system temperature by temporarily supplying heated gas exhaust from the reformer to the cooling jacket. However, the circulation of the heated exhaust air from the reformer to the cooling jacket considerably complicates the piping and plumbing system and also can give rise to the possibility of overheating.

It is, therefore, a principal object of this invention to provide an improved, simplified and highly effective fuel cell.

It is a further object of this invention to provide a fuel cell arrangement wherein the fuel cell can be brought up to its operating temperature as soon as possible without the use of extraneous heating devices.

It is a further object of this invention to provide an improved system for heating a fuel cell to its operating temperature through-the use of the exhaust gases from the reformer as a heating device for this cell without necessitating a separate heating jacket or the use of these gases in the cooling jacket of the cell.

SUMMARY OF THE INVENTION

This invention is adapted to be embodied in a fuel cell system for generating electrical power from a reaction of a reformed fuel with air in the cell. The system comprises a source of fuel and a reformer for reforming the fuel from the source through the application of heated air therethrough. Valve means selectively apply the heated air from the reformer to the air port of the fuel cell for warm up or unheated air thereto for normal operation.

DETAILED DESCRIPTION OF THE PREFERRED EMBODIMENTS OF THE INVENTION

Figure 1:
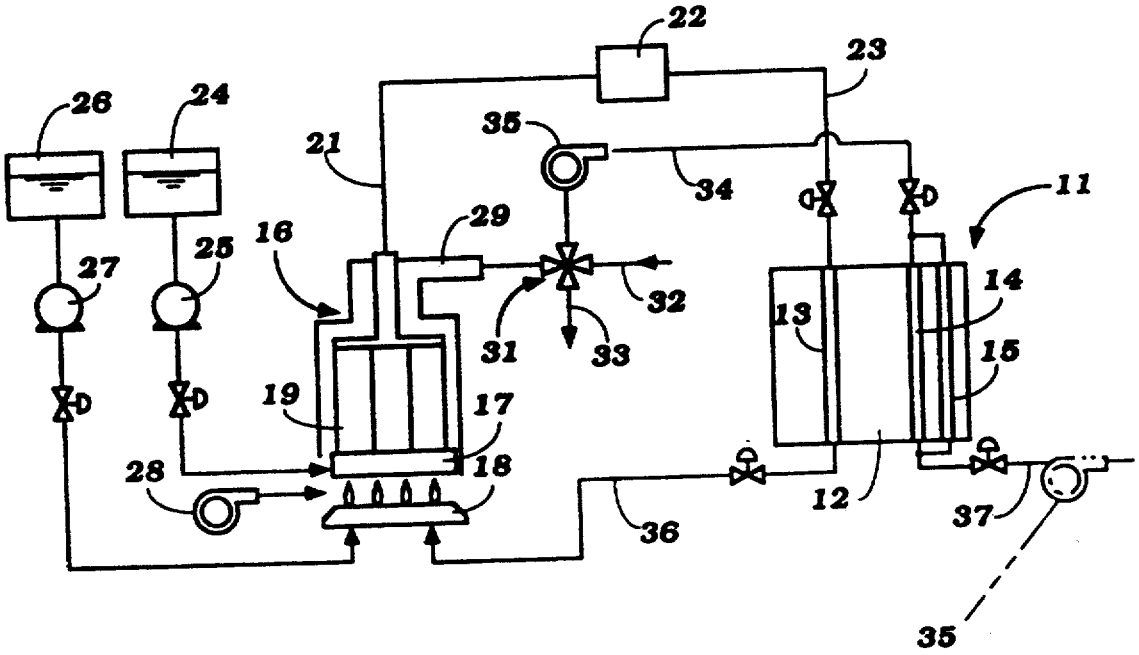
FIG. 1 is a partially schematic view of a fuel cell system constructed in accordance with an embodiment of the invention.

Referring first in detail to FIG. 1, a fuel cell is identified generally by the reference numeral 11 and is comprised of an electrolytic matrix core 12 with fuel ports 13, air ports 14 and cooling ports 15 disposed in laminated form therein so as to cause an electrochemical reaction, as aforenoted. A reformer, indicated generally by the reference numeral 16 and comprised of a vaporizer 17, heater 18 and catalytic core 19, which are provided for supplying fuel to the fuel cell fuel port through a conduit 21. The conduit 21 delivers the fuel from the reformer 16 to a reservoir 22 wherefrom it is delivered to the fuel port 13 through a supply conduit 23.

The fuel to be reformed is supplied to the reformer 16 from a fuel tank 24. The fuel contained in the fuel tank 24 is a reaction fuel such as a methanol/water mixture that is reformed in the reformer 16 into a hydrogen rich reformed gas. A pump 25 supplies the fuel from the tank 24 to the reformer 16.

The heater 18 of the reformer is also supplied with fuel from a fuel tank 26 and this fuel may be of any known nature such as methanol and is delivered by a pump 27 to the burner unit 18. Forced air is supplied to the reformer 16 for combustion and heating purposes from the atmosphere through a blower 28. The heated air extends through a jacket of the reformer 16 and is discharged through an exhaust pipe 29.

In accordance with the invention, a control valve means, indicated generally by the reference numeral is provided for selectively supplying atmospheric air from an atmospheric air inlet 32 to the air port 14 and cooling jacket 15. In this condition, the exhaust gases from the reformer exhaust pipe 29 are delivered to the atmosphere through an atmospheric heating gas outlet 33. Alternatively, the exhaust gas control valve means 31 is movable to a position so as to supply heated exhaust gases from the reformer exhaust pipe 29 to the air ports 14 and cooling jacket 15. It should be noted that these exhaust gases are still rich in oxygen since the reformer 16 operates with considerable excess air.

Figure 2:
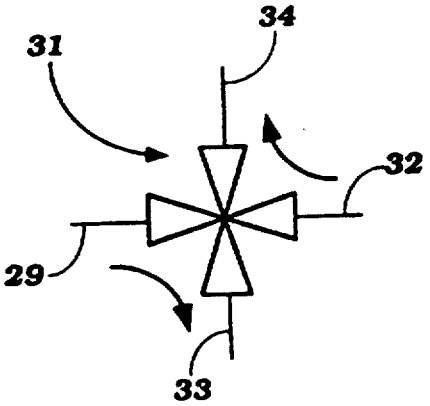
FIG. 2 is a partially schematic view showing the air control valve for the system in the non preheating mode.
Figure 3:
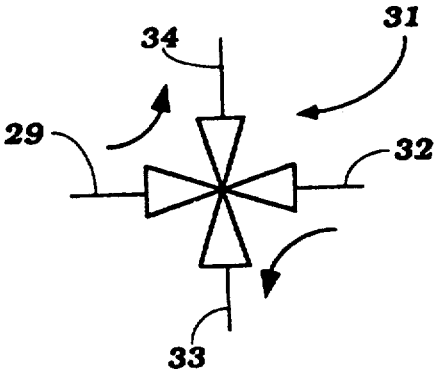
FIG. 3 is a schematic view, in part similar to FIG. 2, showing the air valve in the preheating mode.

In the embodiment of FIGS. 1 through 3, the control valve means 31 is a four port, two way valve which in normal operating mode (FIG. 2) is disposed so that the exhaust gases from the reformer exhaust pipe 29 are delivered to the atmosphere through the discharge 33 and atmospheric air is supplied from the inlet port 32 to a conduit 34 in which a blower 35 is positioned for delivery to the air port 14 and cooling jacket port 15.

However, when starting up for quick warm up, the valve means 31 is positioned in the position shown in FIG. 3 so that the exhaust pipe 29 communicates with the conduit 34 for supplying the heated air to the air port 14 and cooling jacket port 15. In this condition, atmospheric air from the port 32 merely communicates back with the atmosphere through the exhaust port 33. This system continues to operate in this mode until the fuel cell 11 is at to the proper temperature at which case the valve 31 is switched back to the position shown in FIG. 2.

It should be noted that the fuel exhausted from the fuel port 13 and fuel cell 11 is returned back to the burner 18 through a return passage 36 so that no fuel will be wasted.

In the embodiment of FIG. 1, the blower 35 was positioned between the valve 31 and the fuel cell 11. However, the blower 35 may be positioned at any of a variety of locations such as in communication with the exhaust port 37 of the fuel cell as shown in phantom in FIG. 1.

Figure 4:
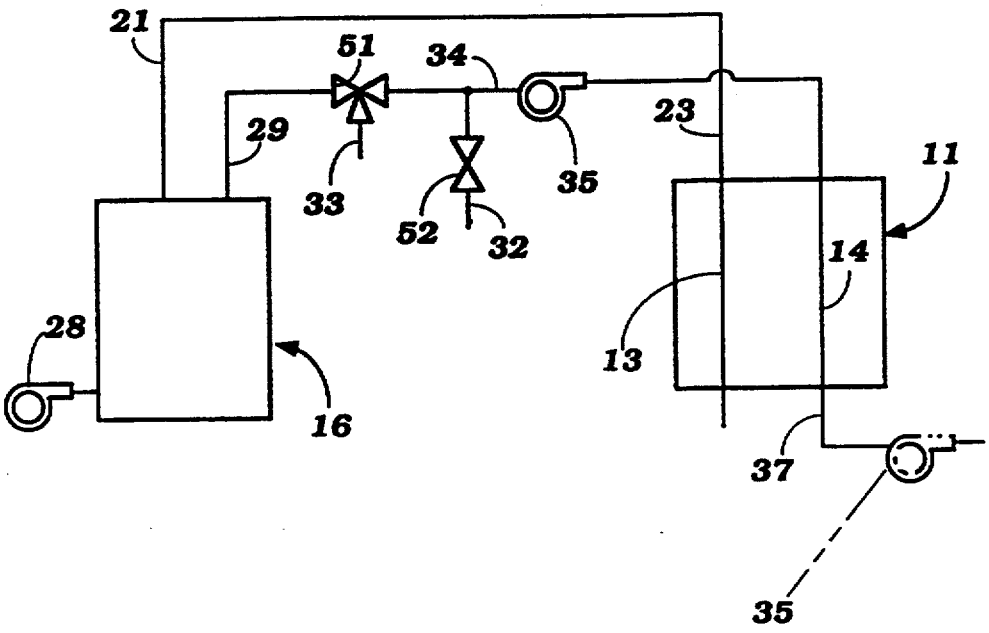
FIG. 4 is a partial schematic view showing another embodiment of the invention.

In the embodiments thus far described, the control valve means 31 comprise a four port, two way valve. However, other types of valve arrangements can be employed. FIG. 4 shows an arrangement wherein the control valve means is comprised of a three port, two way valve 51 which selectively communicates the exhaust pipe 29 with either the conduit 34 or the atmospheric discharge 33. In addition, there is provided a two port, two way valve 52 that selectively communicates with the conduit 34 downstream of the valve 51. The valve 52 when closed will preclude any flow from the conduit 34 to the atmospheric inlet 32. However, when the valve 52 is opened and the valve 51 is closed, then atmospheric air will be supplied to the air port of the fuel cell 11 as aforedescribed. Also, as aforedescribed, the blower 35 may either be positioned in the conduit 34 or in the exhaust conduit 37 as shown in the phantom line views in this figure.

Figure 5:
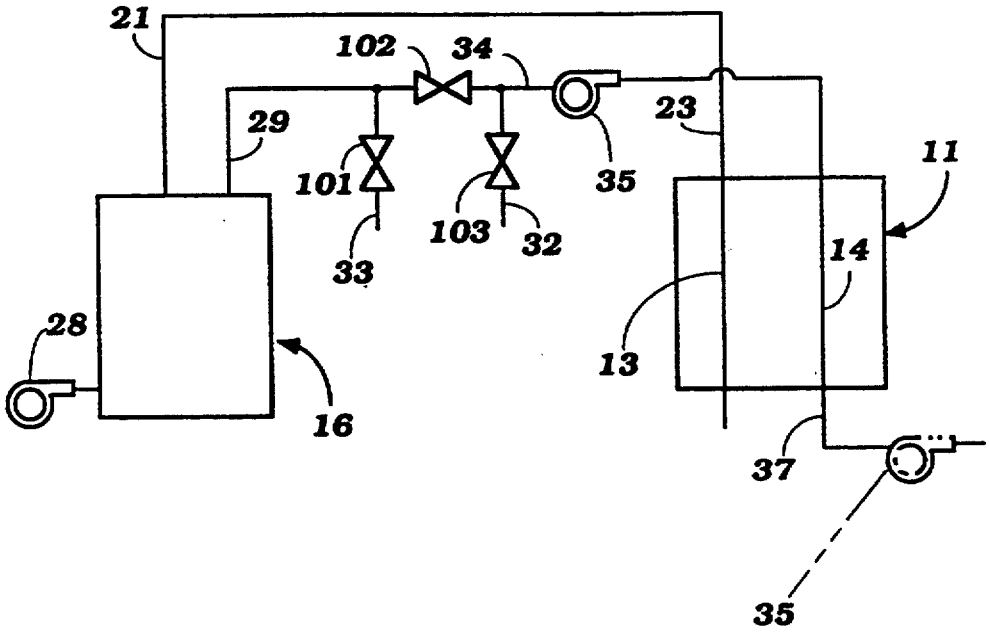
FIG. 5 is a partial schematic view, in part similar to FIGS. 1 and 4, and shows a still further embodiment.

FIG. 5 shows another arrangement of control valve means which, in this embodiment, include three two way, two port valves 101, 102 and 103. The valve 101 controls the communication between the exhaust pipe 29 and an atmospheric exhaust gas discharge 33. When closed, the valve 101 will direct the exhaust gases to the second control valve 102. Normally the control valve 102 will be closed when the control valve 101 is opened and vice versa. To this end, the control valve 101 and 102 may be operated by a common operator. The control valve 103, on the other hand, selectively communicates an air inlet port 32 with the conduit 34 so that when the control valve 102 is closed and the control valve 103 is opened, the system will operate normally. However, when the control valve 101 is closed and the control valve 102 is opened, the control valve 103 will be closed for heated start up. In addition to the valve arrangements disclosed, other valve arrangements can obviously be employed in conjunction with the invention operating on the aforedescribed principles.

It should be readily apparent from the foregoing description that a number of embodiments of fuel cell systems are disclosed, each of which will provide rapid warm up with a minimum of external and unnecessary plumbing or pipes. As noted, a variety of modifications may be made without departing from the spirit and scope of the invention, which is defined by the appended claims.

We claim:

1. A fuel cell system for generating electrical power from a reaction of a reformed fuel with air in said fuel cell comprising a source of fuel, a reformer for reforming fuel from said source through the application of heated air thereto, and valve means for selectively supplying the heated air exhausted from said reformer to an air port of said fuel cell for rapid start up or unheated air to the air port of said fuel cell for normal operation thereof.

2. A fuel cell system as set forth in claim 1 further including blower means for delivering the air to the fuel cell.

3. A fuel cell system as set forth in claim 2 wherein the blower is positioned in the system for drawing air through an exhaust pipe of the reformer.

4. A fuel cell system as set forth in claim 3 wherein the blower is positioned between the reformer exhaust pipe and the air port of the fuel cell.

5. A fuel cell system as set forth in claim 3 wherein the blower is positioned downstream of the fuel cell.

6. A fuel cell system as set forth in claim *1* wherein the valve means comprises valve means for selectively communicating the exhaust pipe of the reformer with the air port of the fuel cell or with the atmosphere and for selectively communicating atmospheric air with the air port of the fuel cell when the exhaust pipe is not communicating with the air port of the fuel cell.

7. A fuel cell system as set forth in claim 6 wherein the valve means comprises a single four port, two way valve.

8. A fuel cell system as set forth in claim 7 wherein the valve means comprises three two port, two way valves.

9. A fuel cell system as set forth in claim 7 wherein the valve means comprises one three port, two way valve and one two port, two way valve.

* * * * *